United States Patent [19]

Narisawa

[11] Patent Number: 5,749,000
[45] Date of Patent: May 5, 1998

[54] CAMERA HAVING VOICE-INPUT DEVICE FOR CHANGING FOCUS DETECTION

[75] Inventor: Tsutomu Narisawa, Saitama-ken, Japan

[73] Assignee: Nikon Corporation, Tokyo, Japan

[21] Appl. No.: 653,118

[22] Filed: May 24, 1996

Related U.S. Application Data

[63] Continuation of Ser. No. 230,725, Apr. 21, 1994, abandoned.

[30] Foreign Application Priority Data

Apr. 28, 1993 [JP] Japan ................... 5-102608

[51] Int. Cl.$^6$ ................ G03B 3/10; G03B 13/02; G03B 13/30
[52] U.S. Cl. .................. 396/121; 396/147; 396/148
[58] Field of Search .................. 354/467; 396/147, 396/148, 121

[56] References Cited

U.S. PATENT DOCUMENTS 5,005,041  4/1991  Suda et al. .
5,027,149  6/1991  Hoshimo .................. 354/412
5,128,705  7/1992  Someya et al. .................. 354/400

FOREIGN PATENT DOCUMENTS 64-56428  3/1989  Japan .

OTHER PUBLICATIONS

Sourcebook of Automatic Identification and Data Collection, Russ Adams, Van Nostrand Reinhold, New York, pp. 137–139, Dec. 31, 1990.

Primary Examiner—Safet Metjahic
Assistant Examiner—Eric Nelson

[57] ABSTRACT

A camera which can focus on one or more of multiple focus detection areas and which allows a photographer to change the focus to a new focus detection area by voicing a reference code corresponding to the new focus detection area. The camera includes a voice recognition mechanism which recognizes a voice of a photographer, a selection mechanism which selects at least one focus detection area from the multiple focus detection areas in correspondence to a voice recognized by the voice recognition mechanism and a focus mechanism which detects and adjusts respective focus conditions corresponding to the focus detection areas selected by the selection mechanism.

9 Claims, 13 Drawing Sheets

VIEWFINDER DISPLAY

FIG. 9(A)
VIEWFINDER DISPLAY
HORIZONTAL POSITION DISPLAY

| 4 | 5 | 6 |
| 1 | 2 | 3 |
| 7 | 8 | 9 |

FIG. 9(B)
VIEWFINDER DISPLAY
VERTICAL POSITION DISPLAY

| 4 | 5 | 6 |
| 1 | 2 | 3 |
| 7 | 8 | 9 |

FIG. 10(A)
EXTERNAL DISPLAY

CAL 1
V-AF 1

FIG. 10(B)
EXTERNAL DISPLAY

CAL 2
V-AF 1

FIG. 10(C)
EXTERNAL DISPLAY

CAL 1
V-AF 2

FIG. 10(D)
EXTERNAL DISPLAY

CAL 2
V-AF 2

VIEWFINDER DISPLAY
(DURING FIRST VOICE INPUT AF MODE)

VIEWFINDER DISPLAY
(DURING SECOND VOICE INPUT AF MODE)

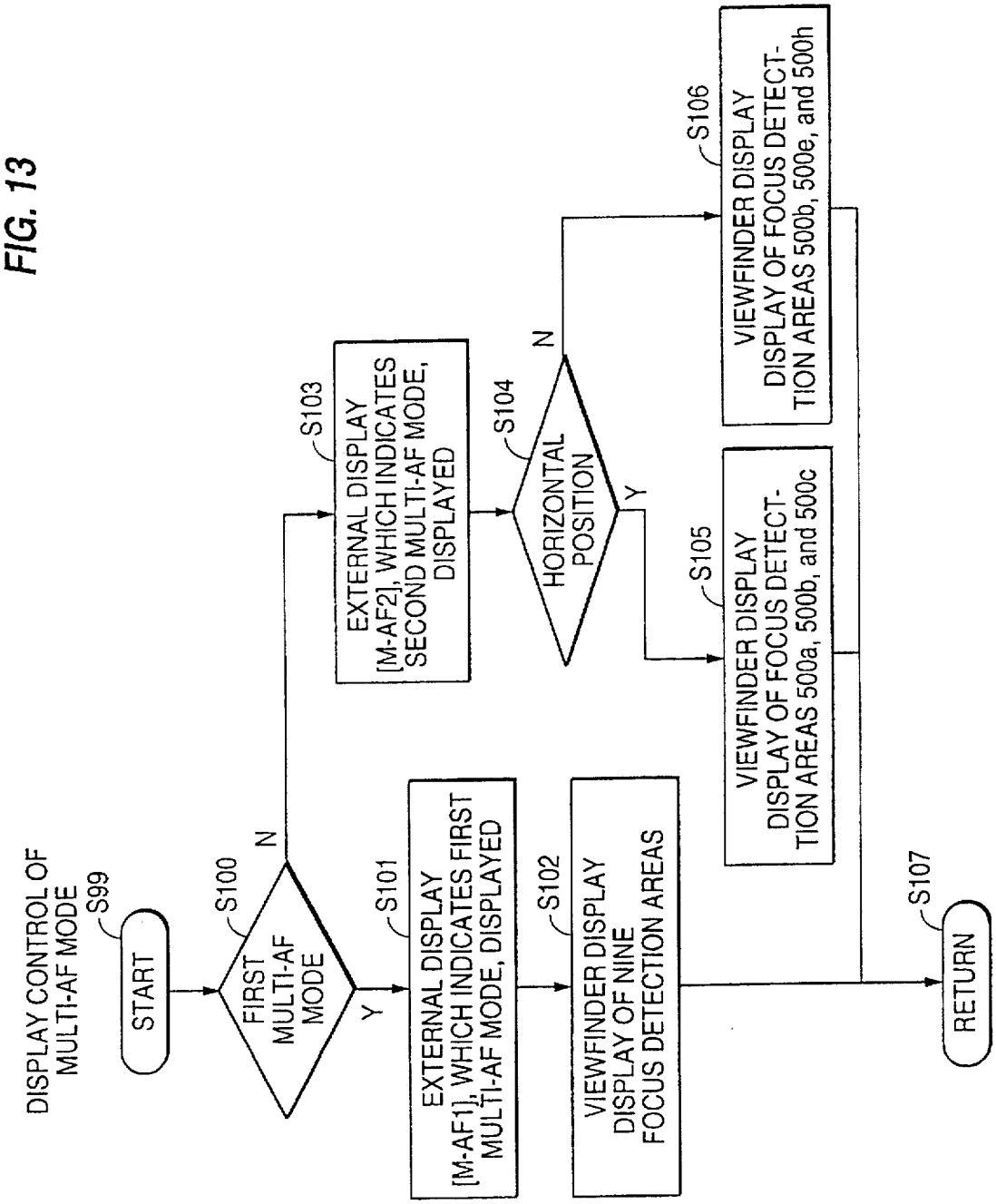

DISPLAY OF FIRST MULTI-AF MODE

DISPLAY OF
SECOND MULTI-AF MODE

HORIZONTAL POSITION DISPLAY

DISPLAY OF
SECOND MULTI-AF MODE

VERTICAL
POSITION DISPLAY

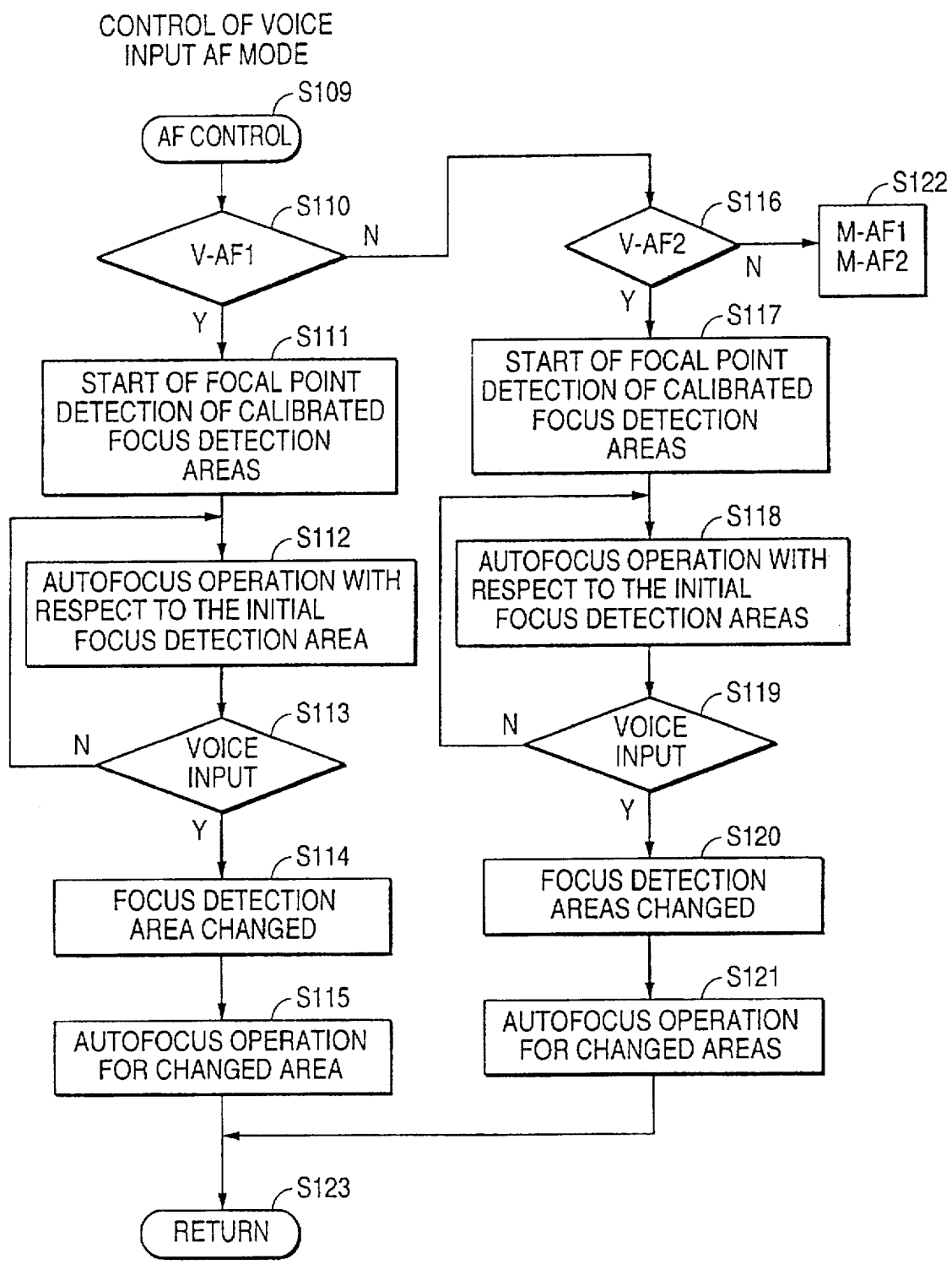

CAMERA HAVING VOICE-INPUT DEVICE FOR CHANGING FOCUS DETECTION

This application is a continuation of application Ser. No. 08/230,725, filed Apr. 21, 1994, now abandoned.

BACKGROUND OF THE INVENTION

1. Field of the Invention

The present invention relates to a camera having a voice input device which recognizes the voice of the photographer to select a focus detection area from multiple focus detection areas in order to change the area of focus detection.

2. Description of the Related Art

Conventional cameras are equipped with focus detection devices which detect multiple focus detection areas. In this manner, a camera can automatically focus on a specifically selected focus detection area. Such cameras are equipped with switches or line of sight detection devices which can be manually operated in order to select a focus detection area.

However, with cameras using manually operated switches to select the focus detection areas, the operation of manually pressing a switch before taking each photograph can be time consuming and inconvenient for a photographer. Therefore, the speed at which photographs are taken is greatly reduced.

Cameras which use a line of sight detection device to select a desired focus detection area provide a convenient and quick selection of a focus detection area. However, a desired focus detection area cannot be appropriately selected when a photographic subject is moving since the photographer's line of sight is not fixed.

SUMMARY OF THE INVENTION

Accordingly, it is an object of the present invention to provide a camera with a quick and convenient operation for selecting a focus detection area.

It is a further object of the present invention to provide a camera with a voice input device which selects a desired focus detection area from among multiple focus detection areas by recognizing the voice of the photographer.

Additional objects and advantages of the invention will be set forth in part in the description which follows and, in part, will be obvious from the description, or may be learned by practice of the invention.

The foregoing objects of the present invention are achieved by providing a camera which can detect multiple focus conditions corresponding, respectively, to multiple focus detection areas. The camera comprises a voice recognition mechanism which recognizes a voice of a photographer, a selection mechanism which selects, when the voice recognition mechanism recognizes the voice, at least one focus detection area from the multiple focus detection areas, the selection being made in correspondence to the voice, a focus mechanism which detects and adjusts respective focus conditions corresponding to the at least one focus detection area selected by the selection mechanism and a display device comprising a viewfinder display with area display portions corresponding, respectively, to the multiple focus detection areas, the display device displaying the respective at least one focus detection areas selected by the selection mechanism on the corresponding area display portions.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 9(A)–9(B) are diagrams illustrating a viewfinder display when calibration is completed for a camera according to an embodiment of the present invention.

FIGS. 10(A)–10(D) are diagrams illustrating the calibration mode and voice input AF mode on the external display for a camera according to an embodiment of the present invention.

FIG. 13 is a flow chart of a processing sequence of display control during multi-AF mode for a camera according to an embodiment of the present invention.

FIG. 15 is a flow chart of a processing sequence for autofocusing operation during voice input AF mode for a camera according to an embodiment of the present invention.

DESCRIPTION OF THE PREFERRED EMBODIMENTS

Figure 1A:
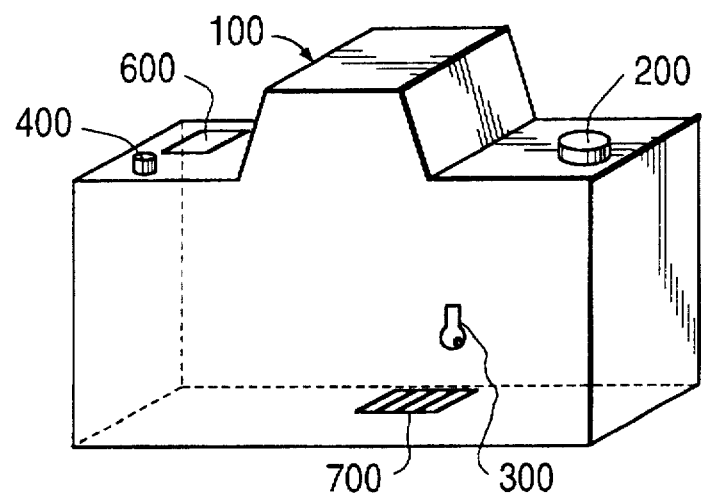
FIG. 1(A) is an perspective diagram of a voice input camera according to an embodiment of the present invention.

Reference will now be made in detail to the preferred embodiments of the present invention, examples of which are illustrated in the accompanying drawings, wherein like reference numerals refer to like elements throughout.

Figure 1B:
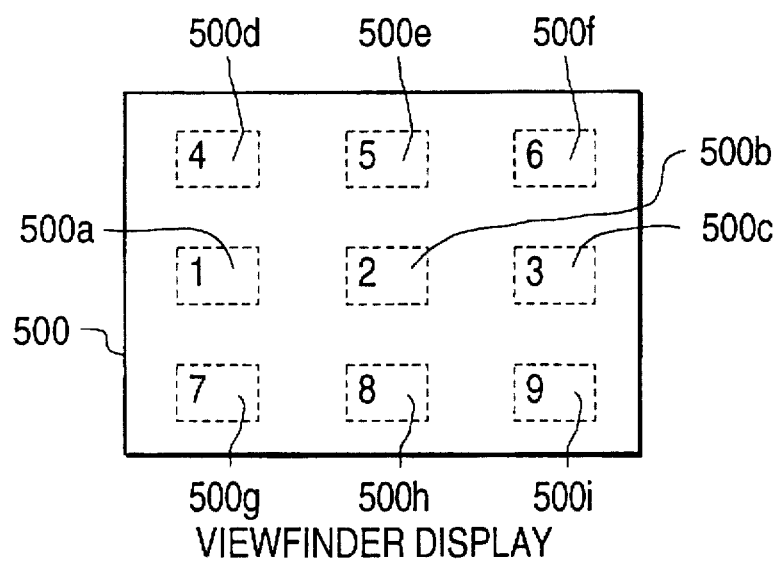
FIG. 1(B) is a diagram which shows a viewfinder display of a camera having a voice input device according to an embodiment of the present invention.

FIG. 1(A) is a perspective diagram of a voice input camera and FIG. 1(B) is a diagram which shows a viewfinder display of a camera having a voice input device according to an embodiment of the present invention. In FIGS. 1(A) and 1(B), camera 100 comprises automatic focus (AF) mode dial 200, AF switch 300, shutter release button 400, viewfinder display 500, external display 600 and external first microphone 700. In addition, camera 100 comprises a common focus detection sensor (see AF sensor 10 in FIG. 2) which is, for example, a pupil resolution focus detection device. Camera 100 also comprises a common exposure control device, such as a photometric sensor (see automatic exposure sensor AE sensor 11 in FIG. 2). Focus detection devices and exposure control devices are well-known in the art and details of the devices will not be further described herein.

The focus detection device, as shown for this embodiment, performs focus detection at nine focus detection areas 500a–500i displayed on viewfinder display 500 and outputs focus detection signals which correspond to the nine focus detection areas 500a–500i.

Figure 2:
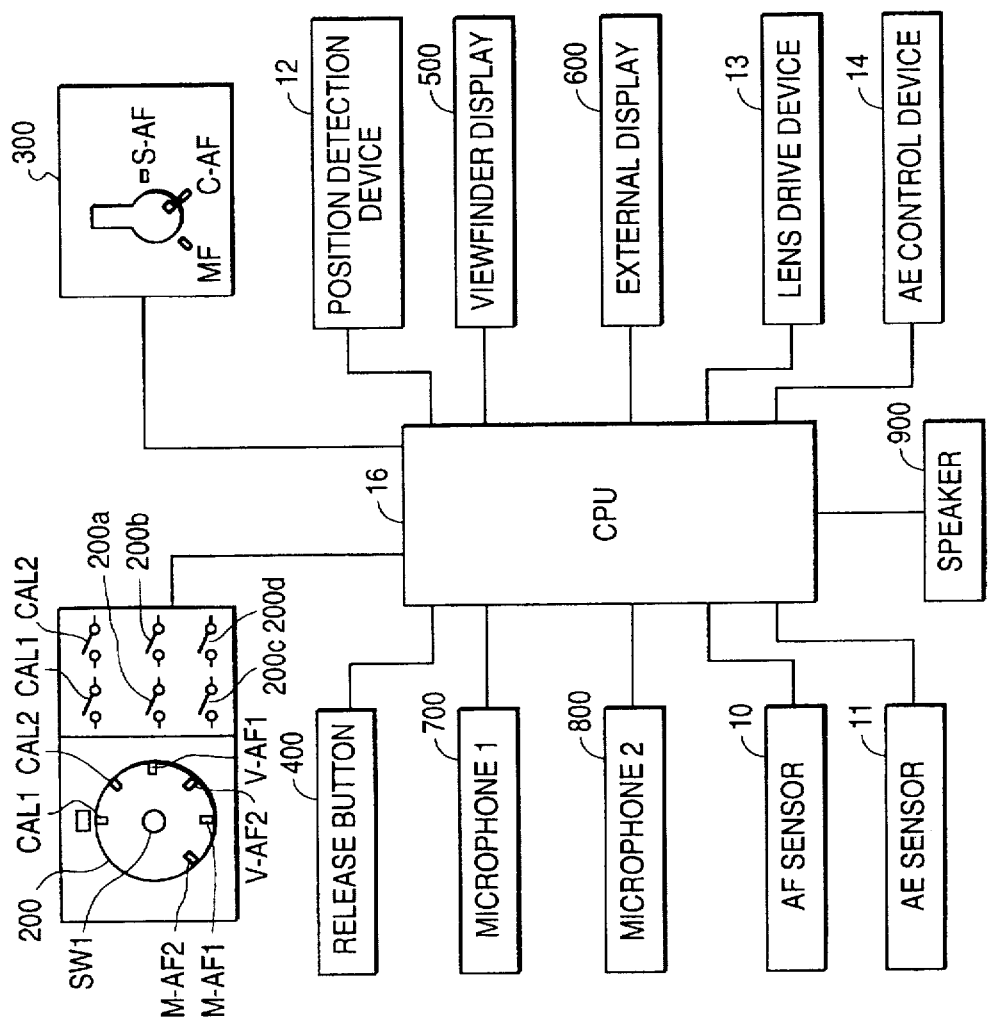
FIG. 2 is a block diagram of an overall configuration of a camera having a voice input device according to an embodiment of the present invention.

As illustrated in FIG. 2, AF mode dial 200 can select from the following switches: a first calibration mode switch CAL1, a second calibration mode switch CAL2, a first voice input AF mode switch (V-AF1) 200a, a second voice input AF mode switch (V-AF2) 200b, a first multi-AF mode switch (M-AF1) 200c, and a second multi-AF mode switch (M-AF2) 200d.

First calibration mode switch CAL1 operates to input a first base data for recognition of the voice of a first photographer.

Second calibration mode switch CAL2 operates to input a second base data for recognition of the voice of a second photographer.

First voice input AF mode switch 200a initiates a mode where focus control is performed based on focus detection signals of one focus detection area, wherein the selection of the one focus detection area is determined from voice input of the photographer.

Second voice input AF mode switch 200b initiates a mode where focus control is performed based on focus detection signals of two focus detection areas, wherein the selection of the two focus detection areas is determined from voice input of the photographer.

First multi-AF mode switch 200c initiates a mode where focus control is performed based on a selected number of the nine focus detection areas, wherein the selection of the focus detection areas is determined from voice input of the photographer.

Second multi-AF mode switch 200d initiates a mode where focus control is performed by selecting the focus detection areas to be used from among the three focus detection areas 500a–500c in the center of viewfinder display 500.

Switch SW1 is positioned in the center of AF mode dial 200. SW1 operates as a calibration operation switch when SW1 is set to the first and second calibration mode switches CAL1 and CAL2, respectively. SW1 operates as a switch to select the base data of the voice of the photographer when SW1 is set to the first and second voice input AF mode switches 200a, 200b, respectively.

AF switch 300 switches among three modes: "S-AF mode" in which shutter release is not permitted until an in-focus signal is obtained; "C-AF mode" in which shutter release is possible at any time during the focus detection operation; and "MF mode" in which manual focusing is permitted but autofocusing is not permitted.

External microphone 700 is attached to the lower section of the back of the body of camera 100. Microphone 700 is attached in a position so that it is relatively easy to sense a photographer's voice when the photographer holds camera 100 in a horizontal position and looks into viewfinder display 500. Also, microphone 700 is adjusted to eliminate the influence of external noise so that the photographer's voice can be reliably sensed.

The display of viewfinder display 500 in FIG. 1(B) is equipped with a transmission-type display element such as, for example, an electrochromic element, which is attached in the vicinity of a focusing screen (not illustrated). Through the transmission-type display element, nine numerical displays (1 to 9) and frame displays (dotted rectangles surrounding each numerical display) of the focus detection areas 500a–500i are displayed.

As shown in FIG. 2, camera 100 is controlled by microcomputer 16. CAL1, CAL2, first voice input AF mode switch 200a, second voice input AF mode switch 200b, first multi-AF mode switch 200c, second multi-AF mode switch 200d, SW1, AF switch 300, microphone 700 , release button 400, viewfinder display 500 and external display 600 are electrically interfaced to microcomputer 16. A second microphone 800 can also be placed on camera 100 and interfaced to CPU 16. As illustrated in FIG. 2, the following devices are also electrically interfaced to microcomputer 16: speaker 900, focus detection sensor (AF sensor) 10, photometric sensor for automatic exposure (AE sensor) 11, position detection circuit 12 (which detects the horizontal/vertical position of the camera), in-focus controlled lens drive circuit (lens drive device) 13 and automatic exposure control circuit (AE control device) 14.

Figure 3:
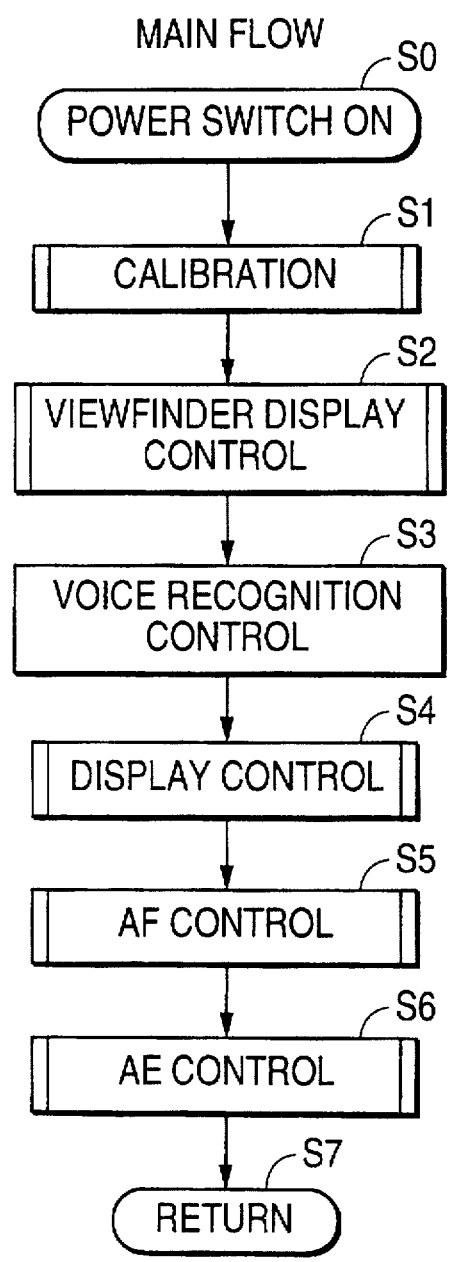
FIG. 3 is a flow chart indicating a main processing sequence of a microcomputer of a camera having a voice input device according to an embodiment of the present invention.

FIG. 3 illustrates a main processing sequence of microcomputer 16 for a camera including a voice input device according to a present embodiment of the present invention. Microcomputer 16 executes step S1 through step S6 when the camera's power switch (not illustrated) is turned ON at step S0.

In step S1, the voice base data for recognizing the voice of the photographer is detected and stored, and the calibration operation is performed. This detection and calibration operation is illustrated in detail in FIG. 4.

In step S2, viewfinder display control is performed according to the position of the camera. Control of the viewfinder display is illustrated in detail in FIG. 5.

In step S3, voice recognition control is performed where the voice of the photographer is recognized from the base data of step S1. Voice recognition control is illustrated in detail in FIG. 6.

In step S4, display control of viewfinder display 500 and external display 600 is performed from the photographer's voice recognized in step S3. Display control is illustrated in detail in FIGS. 8 and 13.

In step S5, automatic focus control (AF control) is performed where focus detection of the focus detection area(s) is performed. AF control is illustrated in detail in FIG. 15.

In step S6, exposure (AE) control is performed. Exposure control is well-known in the art, and, therefore, a further explanation will be omitted.

Figure 4:
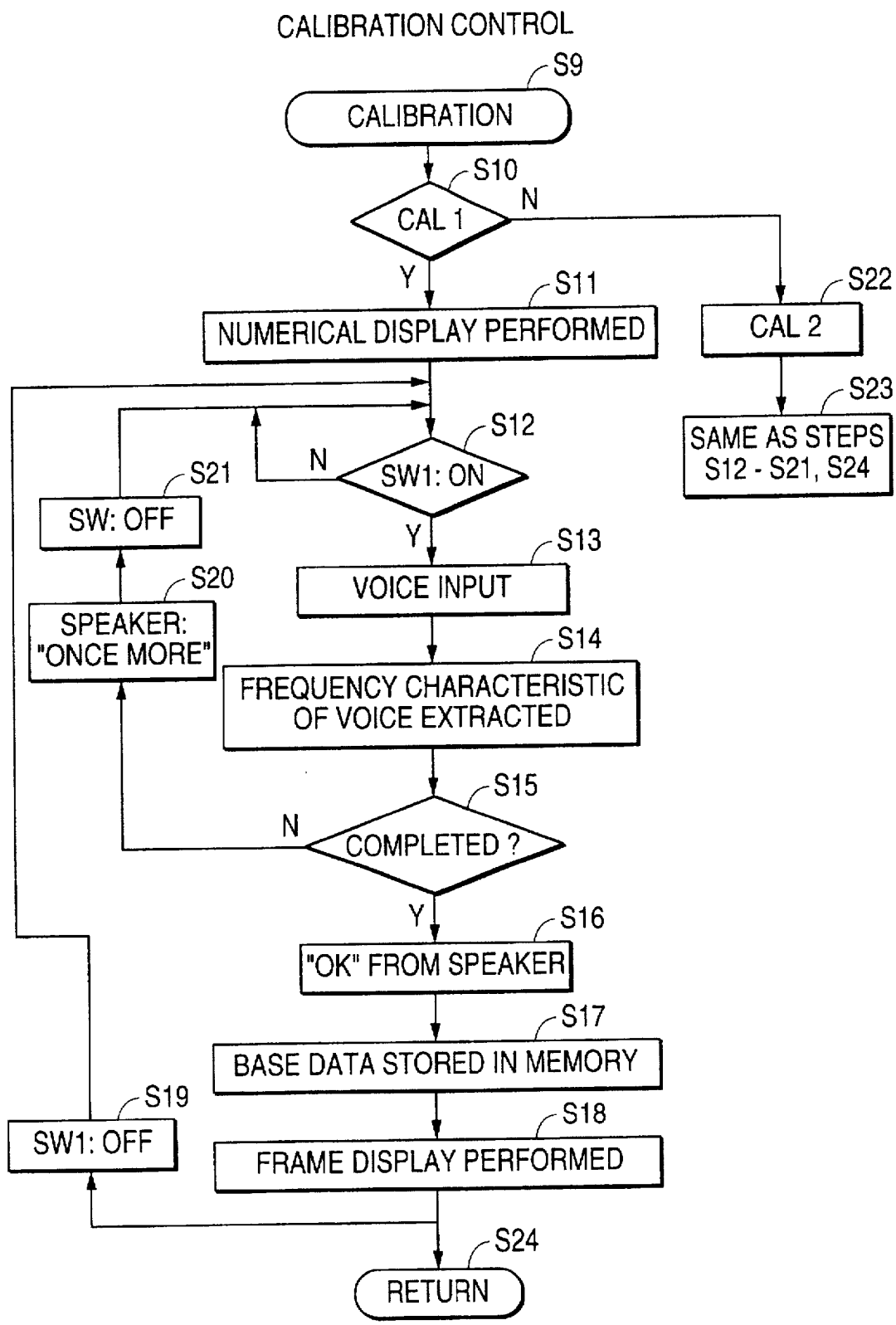
FIG. 4 is a flow chart illustrating the calibration control for voice recognition for a camera according to an embodiment of the present invention.

FIG. 4 illustrates a processing sequence for calibration control of step S1 in FIG. 3. As shown in FIG. 4, the process starts from step S9. In step S10, it is determined if AF mode dial 200 is switched to the first calibration mode switch CAL1. If CAL1 is selected, all of the base data which has been stored in voice recognition memory (not illustrated) of microcomputer 16 in advance is cleared and the process moves to step S11.

In step S11, in order to display the focus detection area(s) for which calibration is to be performed, a numerical display (numbers 1 to 9) is displayed on viewfinder display 500 and external display 600.

In step S12, if switch SW1 is ON, the calibration operation is started, a flag which indicates that switch SW1 is ON is raised, and the system proceeds to step S13.

In step S13, the photographer's voice is input from microphone 700.

In step S14, the frequency characteristic data (base data) is extracted from the photographer's voice signals inputted from microphone 700. A so-called "voiceprint" of the photographer is extracted.

In step S15, it is determined whether the frequency characteristic data has been correctly extracted from the voice signals of the photographer. If, in step S15, the frequency characteristic data has been correctly extracted, the system proceeds to step S16 and a voice saying "OK" is generated by microcomputer 16 and projected through speaker 900 to inform the photographer. Conversely, if the frequency characteristic data has not been correctly extracted in step S15, the system proceeds to step S20 and a voice saying "Once More" is generated by microcomputer 16 and projected though speaker 900 to alert the photographer that voice input must be performed again. In step S21, a flag which indicates the switch SW1 is OFF is raised.

In step S17, the voice frequency characteristic data (base data) which corresponds to the respective focus detection areas 500a–500i is stored in memory (not illustrated).

Figure 7:
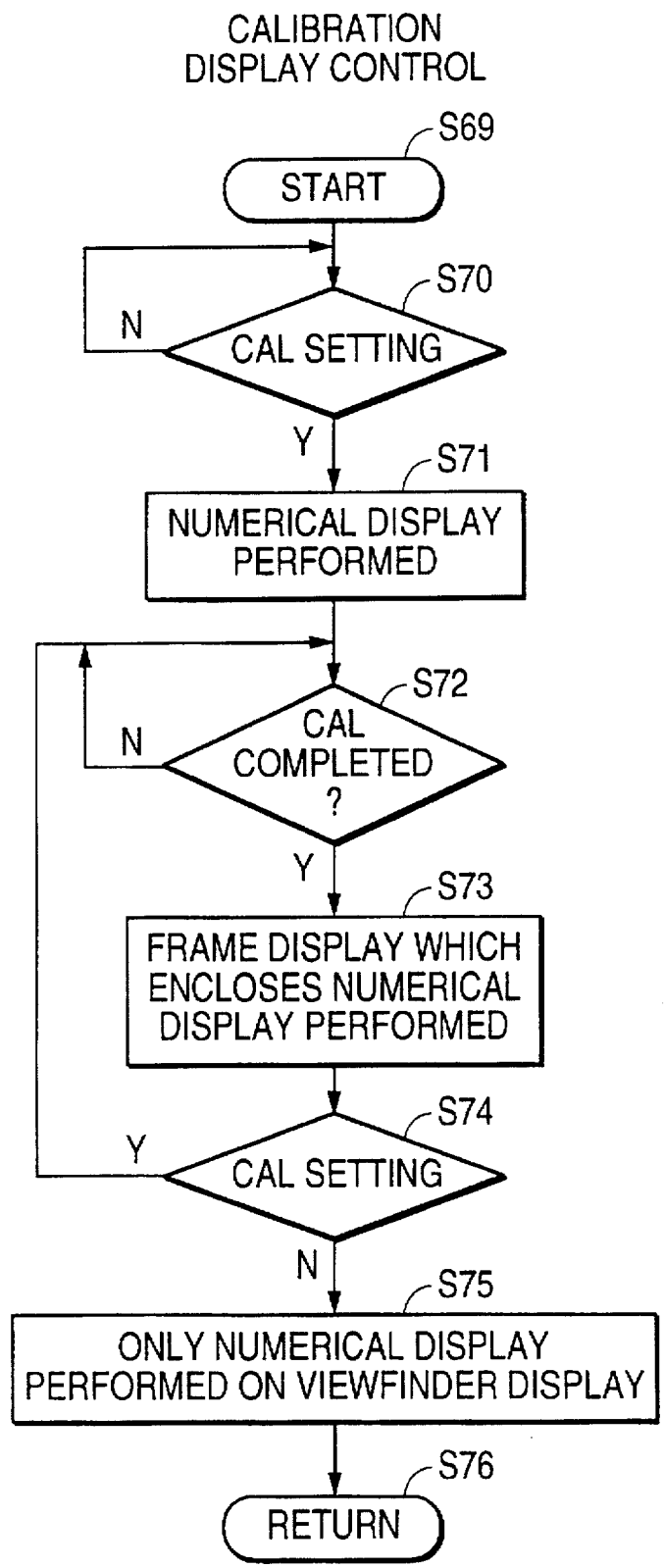
FIG. 7 is a flow chart of a processing sequence for display control during calibration for voice recognition for a camera according to an embodiment of the present invention.

In step S18, areas which correspond to the focus detection areas 500a–500i stored in step S17 are displayed on viewfinder display 500 and external display 600. (FIG. 7 illustrates the details of the control of viewfinder display 500 during calibration.) For example, numerical displays and frame displays are displayed for the focus detection area(s) 500a–500i for which base data storage has been completed. Only numerical displays are displayed for focus detection areas for which storage has not been completed, thereby indicating that calibration has not been performed.

From step S18, the process moves to a "return" at step S24 if calibration is complete. If calibration is not complete, the process moves from step S18 to step S19.

In step S19, switch SW1 is turned OFF, a flag which indicates that SW1 is OFF is raised, and there is a return to step S12 so that calibration is performed for the focus detection areas in which calibration has not been completed.

In step S10, if AF mode dial 200 did not select the first calibration mode switch CAL1, the system moves to step S22, thereby indicating that CAL2 was selected. The process moves to step S23, which is shown as a single block in FIG. 4 but represents the identical steps as steps S12–S21 and S24, respectively. Therefore, calibration is performed for the second photographer under CAL2 as was performed for the first photographer under CAL1.

Based on the processing sequence of FIG. 4, the focus detection areas which the photographer desires are set. That is, the photographer does not need to calibrate all of the focus detection areas 500a–500i, but is able to set only the desired focus detection areas. As a result, the focus detection areas for which calibration has been completed are the focus detection areas which can be selected in voice input AF mode. For example, if the focus detection areas for which calibration has been completed are focus detection areas 500a–500f, then selection is possible by voice input of any one of the focus detection areas 500a–500f.

The configuration is such that, by repeating the calibration operation described in FIG. 4, the accuracy of the base data is improved by a learning function, and accuracy is improved during voice recognition control.

Figure 5:
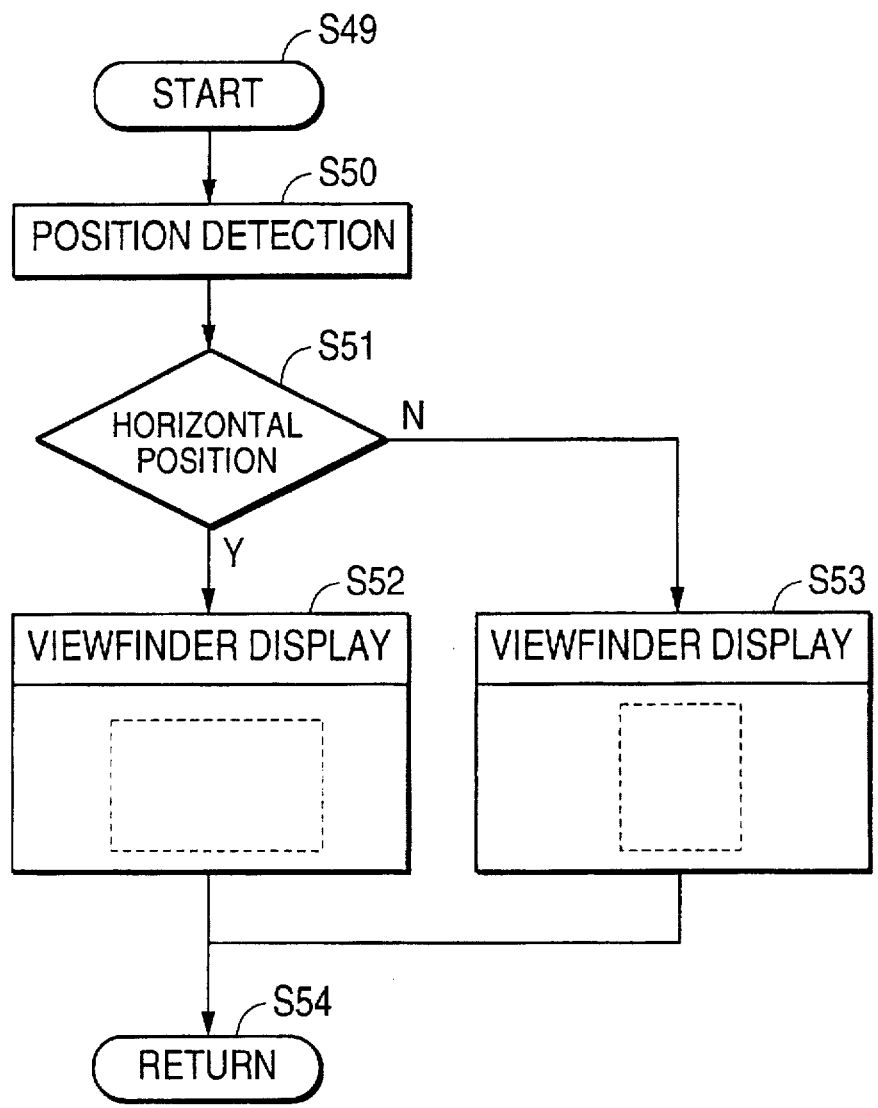
FIG. 5 is a flow chart illustrating a processing sequence for microphone start up for voice recognition for a camera according to an embodiment of the present invention.

FIG. 5 illustrates control of the horizontal and vertical positioning of viewfinder display 500. As shown in FIG. 5, the process starts from step S49. In step S50, the camera position is detected based on the output of position detection device 12. In step S51, it is determined whether the camera is in the horizontal or vertical position.

If camera 100 is held in the horizontal position in step S51, processing advances to step S52 and the order of the focus detection areas 500a–500i of viewfinder display 500 is displayed as shown in FIG. 9(A).

If, in step S51, it is detected that the camera 100 is being held in the vertical position, the process advances to step S53 and the order of the focus detection areas 500a–500i of viewfinder display 500 is displayed as shown in FIG. 9(B). The order of the numerals is the same for both the horizontal and vertical displays. It is the "shape" of the display that changes between the horizontal and vertical displays.

From steps S52 and S53, the process moves to a "return" at step S54.

Figure 6:
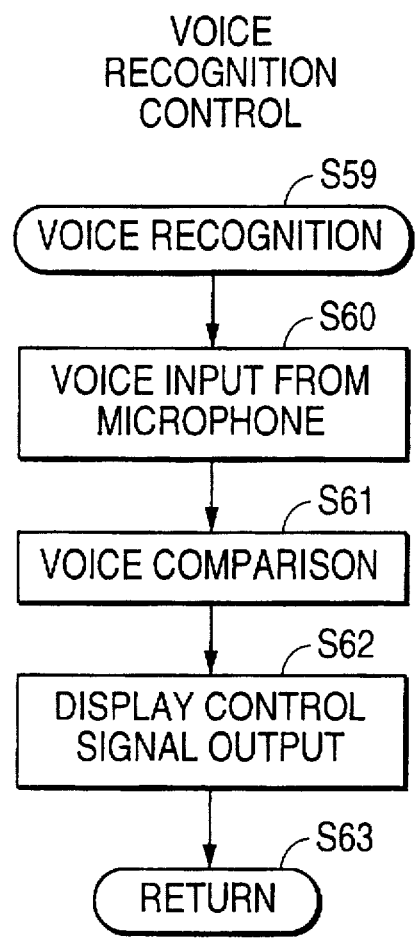
FIG. 6 is a flow chart illustrating a processing sequence of the voice recognition circuit for a camera according to an embodiment of the present invention.

Voice recognition control is illustrated in FIG. 6. The process starts from step S59. In step S60, the photographer's voice is input from microphone 700. In step S61, the base data of the photographer's voice (which was stored in the previously described calibration operation described in FIG. 4) and the frequency characteristic data of the voice input in step S60 are compared. If base data from the calibration operation of two photographers has been stored, the base data of one of the photographers is selected by switch SW1 selecting either CAL1 or CAL2. Normally, when the main power switch (not illustrated) of camera 100 is turned ON, the base data which has been input from calibration mode switch CAL1 is selected.

In step S62, a display control signal which controls the display of the focus detection areas 500a–500i is output based on the voice recognized in step S61.

From step 61 the process moves to a "return" at step S63.

Control of viewfinder display 500 and external display 600 during calibration (FIG. 4) is described with reference to FIG. 7. As shown in FIG. 7, the process starts from step S69. In step S70, it is determined whether calibration mode switch CAL1 or calibration mode switch CAL2 has been selected by AF mode dial 200. The process proceeds to step S71 if either CAL1 or CAL2 has been selected. Otherwise, the processing sequence waits at step S70.

In step S71, a numerical display (1–9) corresponding to the focus detection areas 500a–500i on viewfinder display 500 and external display 600 is displayed and a command is given to the photographer to perform calibration. Only a numerical display, and not a frame display, is displayed at this time.

In step S72, if calibration of the focus detection areas desired by the photographer is completed, then the process proceeds to step S73. In step S73, a frame display which corresponds to the focus detection areas for which calibration has been completed is made on viewfinder display 500 and external display 600. Each frame display encloses one numerical display. For example, see FIG. 1(B) where frame displays (dotted lines) enclose numerals.

In step S74, it is determined whether calibration mode switch CAL1 or CAL2 is still selected or "pressed" (that is, CAL1 or CAL2 has not been respectively released). If the respective CAL1 or CAL2 switch is still pressed, the system returns to step S72 and a frame display is made for each focus detection area for which calibration has been completed. In this manner, numerical displays and frame displays are formed simultaneously on viewfinder display 500 and external display 600 for the focus detection areas for which calibration has been completed. Therefore, the photographer can distinguish between the focus detection areas for which calibration has been completed and the focus detection areas for which it has not been completed. This is because only a numerical display is performed for the focus detection areas for which calibration has not been completed and a numerical display and frame display is performed for the focus detection areas for which calibration has been completed.

Alternatively, the configuration may be such that only a frame display (and not a numerical display) is performed for the focus detection areas for which calibration has been completed. In this manner, the photographer can distinguish between the focus detection areas for which calibration has been completed and the focus detection areas for which it has not been completed, since only a numerical display is performed for the focus detection areas for which calibration has not been completed.

In step S75, the respective calibration mode switch CAL1 or CAL2 has been released. At this point, only the focus detection areas for which calibration has been completed are displayed on viewfinder display 500. A numerical display (and not a frame display) for the focus detection areas for which calibration has been completed is displayed on the viewfinder display 500. A focus detection area display is not permitted on the external display 600. Instead, external display 600 is used to display other photographic data.

From step S75 the process moves to a "return" at step S76.

In this manner, the photographer can select the focus detection areas by peering into viewfinder display 500 and pronouncing the number of the desired focus detection areas.

Figure 8:
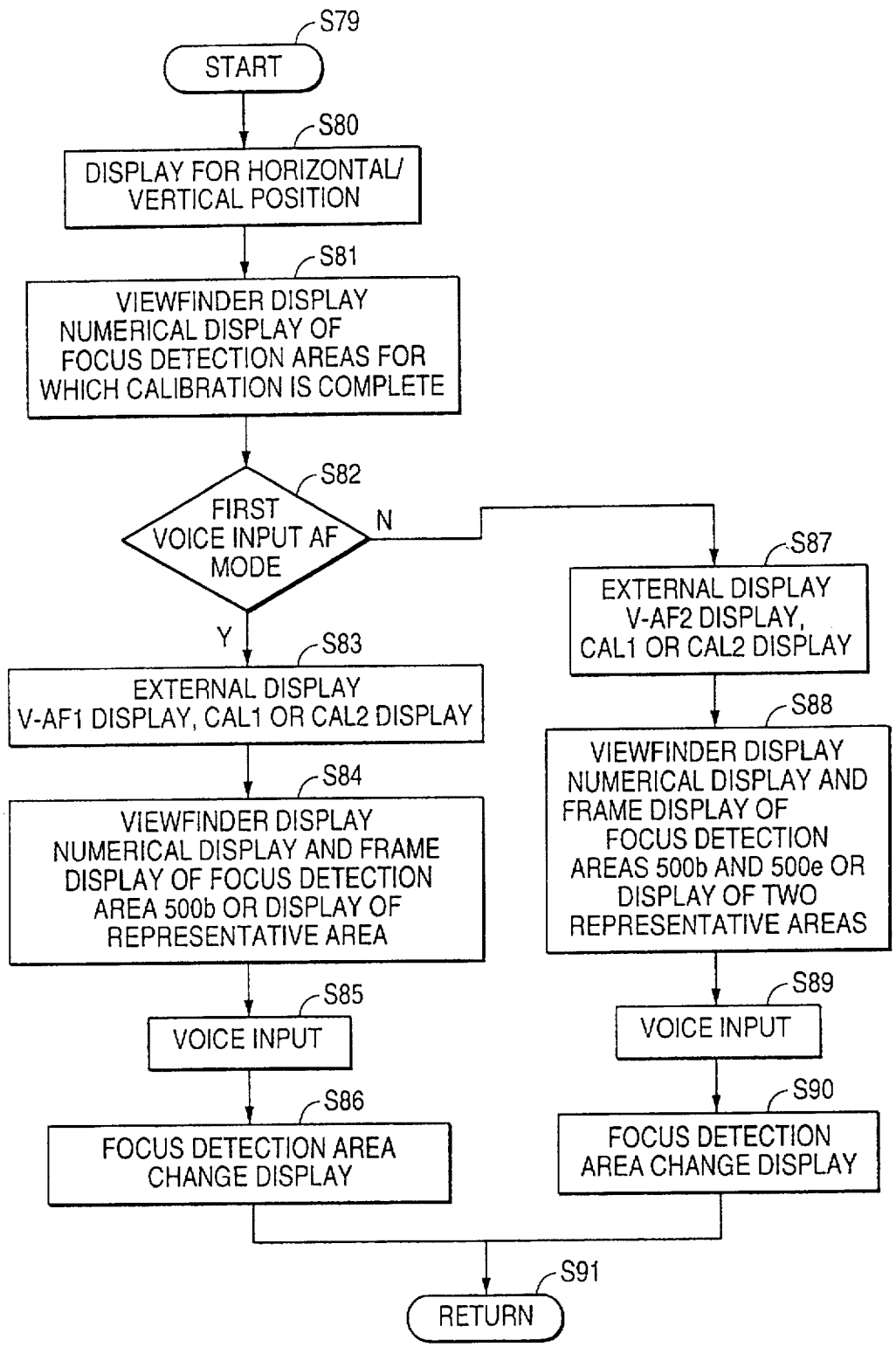
FIG. 8 is a flow chart of a processing sequence of display control during voice input AF mode for a camera according to an embodiment of the present invention.

FIG. 8 illustrates display control when AF mode dial 200 is operated and calibration mode switch CAL1 or CAL2 is switched to first or second voice input AF mode switch 200a or 200b. The process starts at step S79. In step S80, the position of camera 100 is detected and display is performed in the horizontal position or the vertical position so that the order of the focus detection areas 500a–500i does not change (see steps S52 and S53 in FIG. 5).

In step S81, a numerical display (and not a frame display) for the focus detection areas for which calibration has been completed is displayed on viewfinder display 500. Specifically, display of the focus detection areas for which calibration has been completed is performed based on the calibration operation performed by calibration mode CAL1. When a photographer would like to change the calibration mode to calibration mode CAL2, the photographer must operate switch SW1 to select CAL2. Through this selection via SW1, in addition to being able to select the base data which has been registered in advance through calibration by voice input, a photographer is able to display on viewfinder display 500 the focus detection areas for which selection is possible (that is, the focus detection areas which have been "calibrated" by voice input are displayed on viewfinder display 500).

When camera 100 is in a horizontal position, display of the focus detection areas 500a–500i is performed as shown in FIG. 9(A) and, when the camera 100 is in a vertical position, display of the focus detection areas is performed as shown in FIG. 9(B).

In step S82, it is determined whether first voice input AF mode switch 200a is ON and, if it is ON, the process proceeds to step S83. In step S83, [V-AF1], which indicates the first voice input AF mode, and the selected calibration mode [CAL1] or [CAL2] are displayed on external display 600. Specifically, a combined display such as that shown in FIGS. 10(A) or 10(B) is displayed.

In step S84, display of the initial focus detection area before voice input is performed. If focus detection area 500b (where numeral "2" is displayed) is included among the completed calibration areas selected by the calibration operation from among focus detection areas 500a–500i, this area 500b is considered the initial focus detection area. Both a numerical display and a frame display are displayed for focus detection area 500b (see FIG. 11).

Also, if focus detection area 500b is not selected by the calibration operation, the focus detection area which is in the center of the focus detection areas selected by the calibration operation is set as the initial area. Both a numerical display and a frame display are made for this focus detection area.

Focus detection and an autofocusing operation are performed based on the initial focus detection area set in this manner.

In step S85, the photographer's voice for selecting the focus detection area is input. For example, the photographer says "five".

Figure 11:
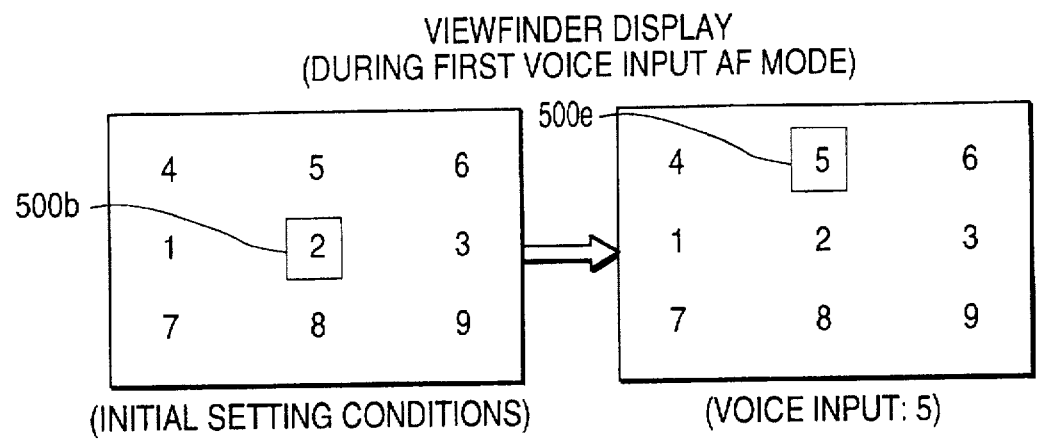
FIG. 11 is a diagram illustrating a viewfinder display during a first voice input AF mode for a camera according to an embodiment of the present invention.

In step S86, through voice recognition control based on the voice input in step S85, there is a change from the initial focus detection area to the desired focus detection area. In this manner, as illustrated in FIG. 11, the initial focus detection area (for example, 500b) has its frame display erased, leaving only a numerical display ("2"), and the focus detection area after the change will have a frame display along with a numerical display ("5").

In step S86, focus detection and an autofocusing operation are performed based on the desired focus detection area. From step S86, the process moves to a "return" at step S91.

Display control of the second voice input AF mode is performed when it is determined, in step S82, that the system is not in first voice input AF mode. The system proceeds from step S82 to step S87 and the second voice input AF mode is entered. The second voice input AF mode is a mode in which two contiguous focus detection areas are selected.

In step S87, the selected calibration mode, [CAL1] or [CAL2], is displayed on the external display 600 along with [V - AF2], which indicates the second voice input AF mode. Specifically, a combined display such as that shown in FIGS. 10(C) or 10(D) is displayed.

In step S88, display of the initial focus detection areas before voice input is performed. Specifically, referring to FIG. 12, if focus detection area 500b ("2" in the numerical display) and area 500e ("5" in the numerical display) are included among the areas selected by the calibration operation from among focus detection areas 500a–500i, these areas, 500b and 500e, are considered the initial focus detection areas. Both a numerical display and a frame display are made for focus detection areas 500b and 500e (see FIG. 12). Therefore, areas 500b and 500e can be considered initial "default" settings.

If focus detection areas 500b and 500e have not been selected by the calibration operation, the two focus detection areas which are in the center of the focus detection areas selected by the calibration operation are set as the initial areas. Both a numerical display and a frame display are made for these two focus detection areas. Focus detection is performed based on the two initial focus detection areas set in this manner. Then, an autofocusing operation is performed based on the average detection signal of the two focus detection results or on the near-side focus detection signal. Focus detection is well-known in the art.

In step S89, the photographer's voice is input to select the focus detection area. For example, the photographer says "three".

Figure 12:
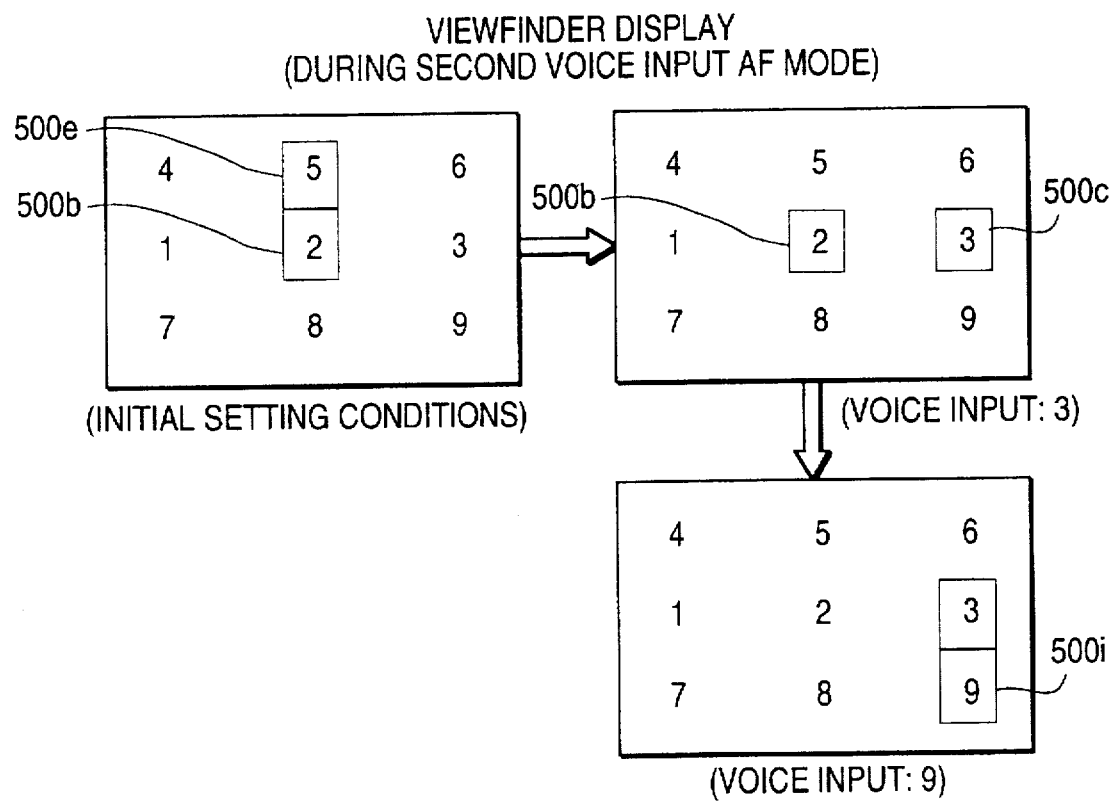
FIG. 12 is a diagram illustrating a viewfinder display during second voice input AF mode for a camera according to an embodiment of the present invention.

In step S90, through voice recognition control based on the voice input in step S89, there is a change from the initial focus detection areas to the desired focus detection areas. As illustrated in FIG. 12, the two initial focus detection areas (for example, 500b and 500e) have their frame display erased, leaving only numerical displays ("2" and "5"), and the two focus detection areas after the change will have a frame display along with a numerical displays ("2" and "3").

Referring to FIG. 12, if the photographer says "nine" to select focus detection area 500i, a frame display is made along with numerical displays ("3" and "9") for the two focus detection areas after the change.

The new focus detection area, determined by voice input, is set after the previous focus detection area (which was positioned directly across from, above, or below the new focus detection area) is changed.

From step S90, the process moves to a "return" at step S91.

Focus detection and an autofocusing operation are performed based on the two focus detection areas set in this manner. Specifically, the configuration is such that when the AF mode dial 200 selects first or second voice input AF mode switch 200a or 200b, focus detection is performed in all of the focus detection areas which were set by the calibration operation and selected by a photographer. This autofocusing operation is illustrated in detail in FIG. 15

Also, in the first voice input AF mode, if two or more areas are not calibrated in the calibration operation, a warning (either a voice or displayed warning) is issued to indicate that the setting of this mode has no effect. In the second voice input AF mode, if three or more areas are not calibrated in the calibration operation, a warning (either voice or a displayed warning) is issued to indicate that the setting of this mode has no effect.

Figure 14A:
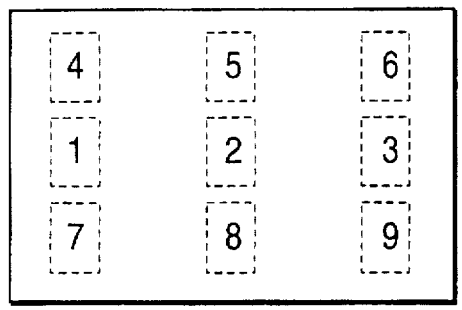
FIG. 14(A) is a diagram which shows a display condition during first multi-AF mode for a camera according to an embodiment of the present invention.

Explanation of the display control of the first and second multi-AF mode is described with reference to FIG. 13. As shown in FIG. 13, the process starts from step S99. In step S100, it is determined whether the first multi-AF mode switch 200c is ON and, if it is ON the system proceeds to steps S101 and S102. In step S101, display of the focus detection areas of the first multi-AF mode is performed. [M-AF1], which indicates first multi-AF mode, is displayed on the external display 600. In step S102, all nine focus detection areas 500a–500i are displayed on viewfinder display 500 (see FIG. 14(A)). From step S102, the process moves to a "return" at step S107.

It should be noted that, in step S5 (FIG. 3), the focus detection signals for each focus detection area displayed in step S102 in FIG. 13 are computed based on a specified algorithm (for example, a close-range priority algorithm), one focus detection signal is computed automatically, and autofocusing is performed based on this signal.

When first multi-AF mode switch 200c is not ON in step S100, the system proceeds to steps S103 through S106 where the focus detection areas of the second multi-AF mode are displayed.

In step S103, [M-AF2], which indicates the second multi-AF mode, is displayed on the external display 600.

In step S104, detection of the position of camera 100 is performed. If camera 100 is in the horizontal position, the system proceeds to step S105 and, if camera 100 is in a vertical position, then the system proceeds to step S106.

Figure 14B:
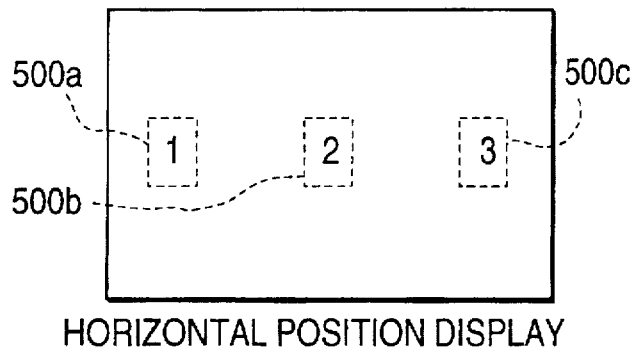
FIG. 14(B) is a diagram which shows the horizontal display condition during second multi-AF mode for a camera according to an embodiment of the present invention.

In step S105, three focus detection areas 500a, 500b, 500c are displayed on viewfinder display 500 (see FIG. 14(B)). It should be noted that, in step S5 of FIG. 3, the focus detection signals of these three areas 500a, 500b, 500c are computed based on a specified algorithm (for example, a close-range priority algorithm), one focus detection signal is computed automatically, and autofocusing is performed based on this signal.

Figure 14C:
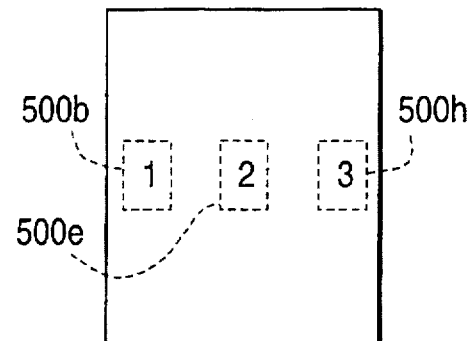
FIG. 14(C) is a diagram which shows the vertical display condition during second multi-AF mode for a camera according to an embodiment of the present invention.

In step S106, three focus detection areas 500b, 500e, 500h are displayed on viewfinder display 500 (see FIG. 14(C)). It should be noted that, in step S5 of FIG. 3, the focus detection signals of these three areas are computed based on a specified algorithm (for example, a close-range priority algorithm), one focus detection signal is computed automatically, and autofocusing is performed based on this signal.

From steps S105 and S106, the process moves to a "return" at step S107.

Control for autofocusing in the various voice input AF modes is explained with reference to FIG. 15. As shown in FIG. 15, the process starts from step S109. In step S110, it is determined whether the system is in first voice input AF mode.

If the system is in the first voice input AF mode in step S110, the system proceeds to step S111 and focus detection is performed for all of the focus detection areas for which calibration has been completed. That is, a focus detection computation circuit (not illustrated, but included as part of CPU 16) receives a signal from AF sensor 10 and outputs a focus detection signal. This focus detection method may be a phase difference detection method which detects the defocus amount (amount of deviation from the in-focus position) of the picture-taking lens or a triangulation method which detects the distance from the camera to the subject. Therefore, the focus detection signal may be a defocus amount signal or a distance signal. Focus detection methods are well-known.

In step S112, autofocusing is performed based on focus detection signals which correspond to the initially set focus detection areas. As previously described in the discussion relating to FIG. 8, area 500b is the initial default setting for the first voice input AF mode.

In step S113, a determination is made as to whether there has been voice input from the photographer. If there is no voice input, the system proceeds back to step S112.

In steps S114, the focus detection areas are changed based on the photographer's voice input. In the example previously discussed in relation to FIG. 8 where the initial area is 500b and the photographer selects "five" via voice input, the focus detection areas change from area 500b to area 500e (see FIG. 11) and, in step S115, autofocusing is performed based on a focus detection signal which corresponds to focus detection area 500e after the change.

From step S115, the process moves to a "return" at step S123.

If the first voice input AF mode has not been selected at step S110, the process moves to step S116. In step S116, it is determined whether the second voice input AF mode has been selected. If it has been selected, the system proceeds to step S117. If the second voice input AF mode has not been selected, the system proceeds to step S122.

In steps S117 through S121, control is also performed in the same manner as in previously described for steps S111 through S115, respectively. However, the second voice input AF mode is selected. Therefore, focus detection signal used in autofocus control is the average value of the focus detection signals normally generated from the two focus detection areas. Otherwise, the focus detection signal used in autofocus control may be the near-side focus detection signal from among the focus detection signals generated from the two focus detection areas. Autofocus methods are well-known in the art.

From step S121, the process moves to a "return" at step S123.

Step S122 represents autofocusing control (AF control) for the first and second multi-AF modes. Step S122 represents steps corresponding, respectively, to steps S111–S115 and also corresponding, respectively, to steps S117–S121. In step S122, similar to step S118, autofocus is performed for multiple detection areas. Autofocusing methods for multiple detection areas are well-known in the art.

Through the present embodiments of a camera according to the present invention, the specified focus detection area can be easily selected by the voice input of the photographer. Also, the photographer is able to use voice input to set in advance the focus detection areas for which selection is possible. In this manner, focus detection which corresponds to a photographer's picture-taking intentions is possible.

The present embodiments of a camera according to the present invention detect focus condition at focus detection areas selected by the voice input of the photographer and at focus detection areas contiguous to a previous focus detection area. Therefore, the system is able to easily follow even violently moving subjects without losing focus detection.

Reference codes which correspond to the focus detection areas of the present embodiment of the present invention are described herein as numerals. However, the focus detection areas can be displayed as alphabetical characters or possibly symbols. These reference codes should be able to be pronounced by a photographer.

The present embodiments of a camera according to the present invention are able to easily select the desired focus detection areas via the voice of the photographer.

The camera having a voice input device of the present invention comprises a focus detection mechanism which outputs focus detection signals corresponding to each of the multiple focus detection areas, a voice recognition mechanism which recognizes the voice of the photographer, a selection mechanism which selects the focus detection areas according to the voice recognized by the voice recognition mechanism, and a display mechanism which has area displays on the viewfinder screen corresponding to the multiple focus detection areas and which displays the focus detection areas according to a selection mechanism. The focus detection mechanism performs focus detection of the focus detection areas selected by the selection mechanism.

Although a few preferred embodiment of the present invention have been shown and described, it would be appreciated by those skilled in the art that changes may be made in these embodiment without departing from the principles and spirit of the invention, the scope of which is defined in the claims and their equivalents.

What is claimed is:

1. A camera which can detect multiple focus conditions corresponding, respectively, to multiple focus detection areas, the camera comprising:

a calibration mechanism which creates a database of frequencies corresponding to the voice of a respective photographer;

a voice recognition mechanism which uses the database of frequencies created by the calibration mechanism to recognize the voice of the respective photographer from other voices;

a selection mechanism which selects, when the voice recognition mechanism recognizes the voice, at least one focus detection area from the multiple focus detection areas, the selection being made in correspondence to the voice;

a focus mechanism which detects and adjusts respective focus conditions corresponding to the at least one focus detection area selected by the selection mechanism; and a display device which includes a viewfinder display with area display portions corresponding, respectively, to the multiple focus detection areas, the display device displaying the respective at least one focus detection areas selected by the selection mechanism on the corresponding area display portions, wherein, when creating the database of frequencies, the calibration mechanism sequentially determines each focus detection area which can be selected by the selection mechanism and the display device displays each sequentially determined focus detection area after the respective focus detection area is determined and before the next sequential focus detection area is determined.

2. A camera which can detect multiple focus conditions corresponding, respectively, to multiple focus detection areas, the camera comprising:

a calibration mechanism which creates a database of frequencies corresponding to the voice of a respective photographer;

a voice recognition mechanism which uses the database of frequencies created by the calibration mechanism to recognize the voice of the respective photographer from other voices;

a selection mechanism which selects, when the voice recognition mechanism recognizes the voice, at least one focus detection area from the multiple focus detection areas, the selection being made in correspondence to the voice;

a focus mechanism which detects and adjusts respective focus conditions corresponding to the at least one focus detection area selected by the selection mechanism; and a display device which includes a viewfinder display with area display portions corresponding, respectively, to the multiple focus detection areas, the display device displaying the respective at least one focus detection areas selected by the selection mechanism on the corresponding area display portions, wherein the selection mechanism comprises a first voice input AF mode for selecting one focus detection area of the multiple focus detection areas and a second voice input AF mode for selecting multiple contiguous focus detection areas of the multiple focus detection areas.

3. A camera as in claim 2, further comprising an operational member which is externally operated to switch between the first voice input AF mode and the second voice AF input mode.

4. A camera as in claim 1, further comprising:

reference codes which correspond, respectively, to the multiple focus detection areas and, in order to display a respective focus detection area, the display device displays the corresponding reference code on an area display portion of the viewfinder display which corresponds to the respective focus detection area.

5. A camera as in claim 4, wherein, for each focus detection area selected by the selection mechanism, the display device displays, on the viewfinder display, the corresponding reference code surrounded by an individual, corresponding frame.

6. A camera as in claim 4, wherein the voice recognition mechanism recognizes when the voice sounds out one of the reference codes.

7. A camera as in claim 5, further comprising:

reference codes which correspond, respectively, to the multiple focus detection areas, wherein the display device displays the reference codes on the viewfinder display, the display device displays on the viewfinder display, for each focus detection area selected by the selection mechanism, the corresponding reference code surrounded by an individual, corresponding frame, when the selection mechanism is in the first voice input AF mode, the display device initially displays on the viewfinder display a focus detection area positioned at the center of the viewfinder display, and when the selection mechanism is in the second voice input AF mode, a display device initially displays, on the viewfinder display, a horizontal row of contiguous, multiple focus detection areas vertically centered in the viewfinder display.

8. A camera having multiple focus detection areas, comprising:

a calibration mechanism which creates a voiceprint of a respective photographer;

a voice recognition mechanism which uses the voiceprint to recognize the voice of the respective photographer from other voices;

a selection mechanism which selects, when the voice recognition mechanism recognizes the voice, at least one focus detection area from the multiple focus detection areas, the selection being made in accordance with information conveyed by the recognized voice; and a display device which includes a viewfinder display with area display portions corresponding, respectively, to the multiple focus detection areas, the display device displaying the respective at least one focus detection areas selected by the selection mechanism on the corresponding area display portions, wherein, when creating the voiceprint, the calibration mechanism sequentially determines each focus detection area which can be selected by the selection mechanism, and the display device displays each sequentially determined focus detection area after the respective focus detection area is determined and before the next sequential focus detection area is determined.

9. A camera as in claim 8, wherein the camera can detect and adjust multiple focus conditions corresponding, respectively, to the multiple focus detection areas, and further comprises:

a focus mechanism which detects and adjusts respective focus conditions corresponding to the at least one focus detection area selected by the selection mechanism, without detecting and adjusting focus conditions corresponding to focus detection areas which were not selected by the selection mechanism.

* * * * *

UNITED STATES PATENT AND TRADEMARK OFFICE
CERTIFICATE OF CORRECTION

PATENT NO. : 5,749,000
DATED : May 5, 1998
INVENTOR(S) : Tsutomu NARISAWA

It is certified that error appears in the above-identified patent and that said Letters Patent is hereby corrected as shown below:

Column 13,   line 16, (claim 7), replace "claim 5" with --claim 2--.

Signed and Sealed this

First Day of September, 1998

Attest:

BRUCE LEHMAN

Attesting Officer

Commissioner of Patents and Trademarks